US006798740B1

(12) United States Patent
Senevirathne et al.

(10) Patent No.: US 6,798,740 B1
(45) Date of Patent: Sep. 28, 2004

(54) METHOD AND APPARATUS FOR SWITCH CORE HEALTH MONITORING AND REDUNDANCY

(75) Inventors: Tissa Senevirathne, Santa Clara, CA (US); Van Hunter, Clearwater, FL (US); Sri Reddy, Los Altos, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/524,093

(22) Filed: Mar. 13, 2000

(51) Int. Cl.[7] .......................... G01R 31/08; G06F 11/00; G08C 15/00

(52) U.S. Cl. ....................... 370/219; 370/220; 370/244; 714/2

(58) Field of Search ................................ 370/217, 218, 370/219, 220, 221, 222, 223, 224, 241, 242, 243, 244; 714/1, 2, 3, 4, 5

(56) References Cited

U.S. PATENT DOCUMENTS 5,398,236 A * 3/1995 Hemmady et al. .......... 370/218
5,408,462 A * 4/1995 Opoczynski ............. 370/220
5,909,427 A * 6/1999 Manning et al. ............ 370/219
5,983,260 A * 11/1999 Hauser et al. .............. 709/201
6,067,286 A * 5/2000 Jones et al. ................. 370/218
6,101,167 A * 8/2000 Shimada ..................... 370/225
6,195,351 B1 * 2/2001 Hiscock et al. ............. 370/389
6,308,282 B1 * 10/2001 Huang et al. .................. 714/4
6,347,073 B1 * 2/2002 Hiscock et al. ............. 370/217
6,359,858 B1 * 3/2002 Smith et al. ............... 370/217
6,366,557 B1 * 4/2002 Hunter ....................... 370/217

* cited by examiner

*Primary Examiner*—Bob A. Phunkulh
(74) *Attorney, Agent, or Firm*—James A. Harrison; Bruce E. Garlick

(57) ABSTRACT

A method and apparatus selecting between primary switching fabric in an asynchronous transfer mode (ATM) network includes a Tap Mux controller that monitors the signals being transmitted to each of four fabric access devices. As each of the fabric access devices receives nine communication lines, the Tap Mux controller monitors a total for 36 communication lines on the primary switching fabric. Because the switching fabric is completely redundant, however, the Tap Mux controller also monitors a total of 36 communication lines on the protection switching fabric. The Tap Mux controller, therefore, includes logic that defines 72 state machines that each monitor one of the 72 lines. Each state machine, in the described embodiment, initiates a defined length time window and counts errors therein. Protection path switching occurs, for example, only when 10 errors occur on any one of the 36 primary switching fabric lines being received by four fabric access devices therein within a 100 millisecond window initiated at the detection of the first error on the communication line. If 10 errors are not detected within a defined communication window, in the described embodiment, the window is terminated and is only reinitiated upon the detection of the next line error.

35 Claims, 7 Drawing Sheets

TAP CTRL AND LINE & SW CORE
FAB CTLR
FABRIC PROC. 104
ERR CHKG
TAP MUX
HMM
108
112
116
120
124
128
132
136
148
TAP 140
TAP 144
TAP 148
TAP 152
TAP 156
TAP 160
TAP 164
TAP 148

METHOD AND APPARATUS FOR SWITCH CORE HEALTH MONITORING AND REDUNDANCY

CROSS REFERENCE TO RELATED APPLICATIONS

This application is related to and includes by reference the following Provisional Application For Patent in its entirety, said Application having been filed Mar. 12, 1999, wherein the time for taking action falls on a Sunday and is extended to Monday Mar. 13, 2000:

Title: Switch Core Health Monitoring and Redundancy in RC2000

Inventors: Tissa Senevirathne, Van Hunter, Sri Reddy Filing Date: 12 Mar. 1999 Ser. No. 60/124,128

BACKGROUND

1. Field of the Invention

The present invention relates generally to data transmission in wide area networks, by way of example, the asynchronous transfer mode (ATM) networks. More specifically, the invention relates to error monitoring within the ATM network and to a decision process for switching to the redundant portions of the switching fabric and network.

2. Related Art

Developments with the telecommunication industry has significantly improved the ability for people to communicate, exchange data, perform research, and, more generally, the ability to access information resources that were unavailable even in recent history to the common person. The new communication networks are altering the business landscape and are altering the very way individuals work, shop, and keep in touch with each other. Not only, for example, can one use cellular phone service or e-mail to communicate with others, one can also now obtain large documents, graphic images, databases, and other types of information having significant memory footprints through wireless and wireline networks.

The manner in which the communication networks are evolving creates a need for more capable information access tools (computers and transceivers, for example). The new tools, in turn, create a need for new networks having increase data throughput capacity and reliability. New networks and information exchange capabilities that were unimaginable even in recent times are being developed and implemented in a way that impacts businesses and individuals in a significant way. For example, standalone computers may now be integrated with wireless radio telephones to allow the transmission of information from the computer to a destination by way of a wireless communication network and then by way of the Internet.

The recent explosion of the Internet is creating the capability and desire for networks of all types to be integrated and coupled to exchange data signals carrying the varying types of information. In many cases, the same data also will also be transported through a local area network (LAN) prior to being delivered to the Internet. Thus, by way of example, a digitized signal can be transported from a source through a LAN and through the Internet, to a final destination. Moreover, within the Internet portion itself, there may be a need to transport the user data through a backbone data transport infrastructure, by way of example, through an ATM network.

Generally speaking, the Internet is, in essence, a collection of many large and small computer networks that are coupled together over high speed backbone data links such as T-1, T-3, OC-1 and OC-3. Stated differently, the Internet is a network of networks. As a result of the creation of the Internet, worldwide access may be achieved. People and their equipment may now communicate from most any civilized point to another in a fast and relatively inexpensive medium.

While it is popular to think of the Internet as one network of networks, there are other such Internets that are in existence and that are under development. For example, the network now commonly known as the Internet was originally a network of institutional networks including university networks. As a result of the commercialization of the Internet and the resultant reduction in quality of service, new generation Internet type networks are under development to better achieve the purposes of the original "Internet". Moreover, new international standards and protocols are being approved to create additional and enhanced Internets. For the sake of simplicity, however, each of the worldwide Internet networks will be referred to collectively as the Internet.

Regarding its physical aspects, the Internet is a packet switched network that is currently based upon a group of protocols known as transmission control protocol/Internet protocol (TCP/IP). TCP is a connection-oriented protocol that first establishes a connection between two computer systems that are to exchange data. TCP then breaks a given digital information signal into packets having a defined format. The packets are then attached to headers that are for containing control and address information.

For example, in addition to a destination address, a TCP packet typically contains a sequence number that is to be used by the destination in reconstructing a signal that is similar to the original digital information that was broken into packets at the originating end. TCP packets also typically include port IDs, checksum values and other types of control information as is known by those skilled in the art.

IP protocol is used for routing purposes. Thus, the IP protocol includes the destination and originating addresses and default gateway identifiers. IP routers, therefore, are operable to evaluate IP protocol information for routing an IP data packet and to evaluate TCP protocol information for error control and other similar purposes.

In order to make communication devices created by companies throughout the world compatible with each other to create local area networks and worldwide networks such as the Internet, protocols and standards are often defined. These protocols and standards are used to guide the design of the communication devices, and more specifically, to guide the design of the operating logic and software within the devices. While communication devices that are designed in view of these standards do not always follow the suggested models exactly, they are usually compatible with the protocol-defined interfaces (physical and logical). In order to appreciate the construction and operation of many devices, it is important to generally understand the concepts of some of the significant protocol standards and models.

One important model that currently guides development efforts is the International Standards Organization (ISO) Open Systems Interconnection (OSI) model. ISO/OSI provides a network framework or model that allows equipment from different vendors to communicate with each other. The OSI model organizes the communication process into seven different categories or layers and places these layers in a sequence based on their relation to the user. Layers 1 through 3 deal provide actual network access and control.

Layers 4 through 7 relate to the point to point communications between the message source and destination.

More specifically, the seven layers in the OSI model work together to transfer communication signals through a network. Layer 1 includes the physical layer meaning the actual hardware that transmits currents having a voltage representing a bit of information. Layer 1 also provides for the functional and procedural characteristics of the hardware to activate, maintain, and deactivate physical data links that transparently pass the bit stream for communication between data link entities. Layer 2 is the data link layer or the technology specific transfer layer that effectuates and controls the actual transmissions between network entities. For example, layer 2 provides for activation, maintenance, and deactivation of data link connections, character and frame synchronization, grouping of bits into characters and frames, error control, media access control and flow control.

Layer 3 is the network layer at which routing, switching and delaying decisions are made to create a path through a network. Such decisions are made in view of the network as a whole and of the available communication paths through the network. For example, decisions as to which nodes should be used to create a signal path are decided at layer 3. As may be seen, layers 1, 2 and 3 control the physical aspects of data transmission.

While the first three layers control the physical aspects of data transmission, the remaining layers relate more to communication functionality. To illustrate, layer 4 is the transport layer that defines the rules for information exchange and manages the point to point delivery of information within and between networks including providing error recovery and flow control. Layer 5 is the session layer that controls the basic communications that occur at layer 4. Layer 6 is the presentation layer that serves as a gateway (a type of "software" interface) between protocols and syntax of dissimilar systems. Layer 7 is the application layer that includes higher level functions for particular application services. Examples of layer 7 functions include file transfer, creation of virtual terminals, and remote file access.

Each of the above defined layers are as defined by the OSI model. While specific implementations often vary from what is defined above, the general principles are followed so that dissimilar devices may communicate with each other.

With respect to the forgoing discussion regarding the seven OSI layers, IP is a layer three protocol. In contrast, many of the backbone data transport infrastructures utilize a different layer protocol than an Internet router. Many of the common backbone data transport systems utilized include time division multiplexed (TDM) transmission systems. TDM systems are generally known. These TDM systems are usually implemented in a manner that provides full redundancy in order to maintain transmission in the event of a fault on one of the channels or communication links. A protection path is, traditionally, a redundant path for transmitting signals in a failure condition.

In ordinary conditions, either the user traffic (data) is not transmitted in the redundant protection path or, alternatively, it is routed but is not processed by a destination. Given the large amounts of data that are transmitted in a modern wide band network, it is important to monitor network conditions in the primary and the protection paths according to which path is being utilized for transporting the data.

Error conditions that prompt a node to switch to the protection path often are related to hardware (layer 1) problems in which communications are not being successfully transmitted in a communication link. As communication glitches are not uncommon, however, it is unacceptable design to have a system that switches the instant that a communication glitch occurs. A system must determine that the glitch results from an actual hardware or communication path failure. Usually, however, it is difficult to make such a determination from only one glitch.

Several challenges exist in implementing topologies having full redundancy. For example, it is necessary for the switching from the working path to the protection path to occur quickly in the event of a fault so that a minimal amount of information is lost. Typically, switching occurs at the layer 1 level to minimize the down time. As a result, however, little error protection is provided at the hardware level for failures. Additionally, layer 1 switching results in the switching of entire data transport pipelines. By way of example, a typical pipeline that is switched as a result of a layer 1 switching decision and event may have a throughput capacity in excess of 100 mega bits per second (Mbps).

A synchronous transfer mode networks, are advantageous in that they are very high-speed transmission broadband type networks that improve network efficiencies by transmitting data, including voice data in an asynchronous manner. Stated differently, conventional networks carry data in a synchronous manner which results in the transmission of empty data slots in a TDM network. Thus, network capacity is wasted.

ATM networks, however, only transmit fixed length data packets, in units called cells, as a need to transmit the data presents itself. Thus, ATM is a broadband, load delay, packet type of switching and multiplexing system that allows for flexible transmission band widths and is capable of transmitting data in excess of a 600 Mbps data transmission rate. Because ATM is operating at such high bit rates, the cell stream is often continuous and without gaps. Cells produced by differing streams to an ATM multiplexer are stored in queues awaiting cell assignment. The ATM system, by building a queue of cells, produces a continuous stream of data thereby maximizing network efficiencies.

Thus, because large amounts of data are likely to be transported during the time that a failure condition is occurring, there an increasing need for providing protection path switching in a manner that reduces unnecessary protection path switching. On the other hand, it also is important to provide switching in a manner that minimizes the amount of data that is lost due to the error condition before the switching occurs. Additionally, there is a need to implements systems that accomplish these goals economically in terms of system resources.

SUMMARY OF THE INVENTION

In order to achieve reliability and high bandwidth, dual switch fabrics and Tap multiplexers are utilized wherein there exists a Tap multiplexer ("Tap Mux") for every line card. Each Tap Mux interfaces with a primary and redundant (protection) path switch fabric access devices. The Tap Mux is connected to each fabric access device by way of four serial lines. Two of the serial lines are for the primary path and two are for the protection path. Each serial line typically carries a nibble (4-bits) of serial data that are eventually converted to a parallel format by a fabric access device. Within the disclosed ATM network, four fabric access devices are provided for converting the four bit nibbles of data into a parallel form. The invention improves network efficiencies by monitoring each of the many communication links within the switching fabric to determine when a switch should occur to the protection path.

In order to economically, in terms of system resources, determine when to provide protection path switching in a described embodiment of the invention, the inventive system monitors each input line for a plurality of fabric access devices in a manner that does not require detected errors to be time stamped. The fabric access devices effectively form an interface between a processing unit and a plurality of Tap Muxes. One function of the Fabric Access Devices (FAD) is to convert the 4-bit nibbles of data received from a plurality of serial buses into a parallel bit stream. Additionally, the FAD selectively switches a source of inputs carrying the nibbles of data to produce an output to the processor unit.

Because there are four FADs in the present system for the primary path and four FADs for the protection path, and because each FAD is connected by nine serial data line sources, namely, one each from the eight different Tap Muxes and one from the Tap Mux of the fabric controller. The present invention includes creating 72 state machines for monitoring each of the input data line sources to the FADs and for determining when switching should occur. Accordingly, the switching logic that is defined herein for the described embodiments is distributed across 72 state machines in one of the described embodiments.

The defined logic, in the described embodiment of the invention, includes monitoring the input line sources for specified errors and, upon the detection of the occurrence of an error, initiating a fixed length window of time during which the occurrence of the specified errors are counted. Once a defined number of errors on a given line is exceeded within the fixed length window of time, switching occurs from the primary path to the protection path. One advantage of utilizing a fixed length window in the described embodiment of the invention is that time stamping of errors is not required. Thus the error-checking algorithm is simplified. Additionally, by defining a number of errors in a communication link for a fixed time length period, a number can be utilized in which occasional glitches do not result in switching but wherein a true hardware type of communication link problem does lead to the fast switching of the network.

Each of the 72 state machines are executed by a health maintenance module formed within a fabric processor. The fabric processor includes an error checking module and a fabric control module. Accordingly, the error-checking module continuously checks each of the 72 input line sources to the four FADs for the detected errors. The health maintenance module communicates with the error-checking module to implement the error switching logic defined herein.

Once the health maintenance module determines that it is necessary to switch fabrics, it communicates with the fabric control module to prompt it to initiate and complete switching from the primary fabric to the protection fabric. Typically, switching is provided for the entire fabric even if the error is found to occur in only one communication line of the primary switching fabric.

Each of these modules are logically formed by computer instructions stored within a storage device of the Fabric controller and are executed by an internal processor in communication therewith by way of an internal bus. The processor executes the computer instructions stored within the storage device to perform the functionality represented by the fabric control module, the error-checking module, and the health maintenance module. The storage device includes additional computer instructions, that define the Fabric controller's interaction and data processing capabilities in general. The processor of the Fabric controller generates control signals that are to be transmitted externally by way of a parallel bus that is controlled by an internal bus controller.

An inventive method of the described embodiment of the invention generally includes checking for the occurrence of errors of a defined set of errors, and when such an error is found, setting an error counter to one and then starting a fixed length timing window. Each time an error is received, the error-counter is incremented to monitor the total number of errors. If the total number of errors for a given communication link exceeds a specified number within fixed length timing window, i.e., since receipt of the first error, switching to the protection path is initiated.

If the specified period expires before the specified number of errors is reached, the system is reset and the error counter is reset to zero. This algorithm is performed for all 72 data line sources being received by the plurality of FADs.

In an alternate embodiment of the invention, a sliding window is used. More specifically, each error is recorded with a time stamp. If a specified number of errors are detected within a defined time period, then protection path switching is initiated. This alternate embodiment is not as desirable because it requires a more complicated algorithm that evaluates the time stamps of the detected errors. On the other hand, it is advantageous in that it will always detect the condition in which a specified number of errors are detected within a specified period of time. In the described embodiment, protection path switching only occurs if the specified number of errors are detected within the initiated fixed length timing window.

In one described embodiment of the invention, four types of error are monitored for the Tap Mux and for the FADs. Those errors are cell parity, idle pattern, clock recovery, and phase lock loop lock. For the switch fabric, however, two errors are monitored. They are the buffers in use error and the free que head pointer error.

DETAILED DESCRIPTION OF THE DRAWINGS

Figure 1:
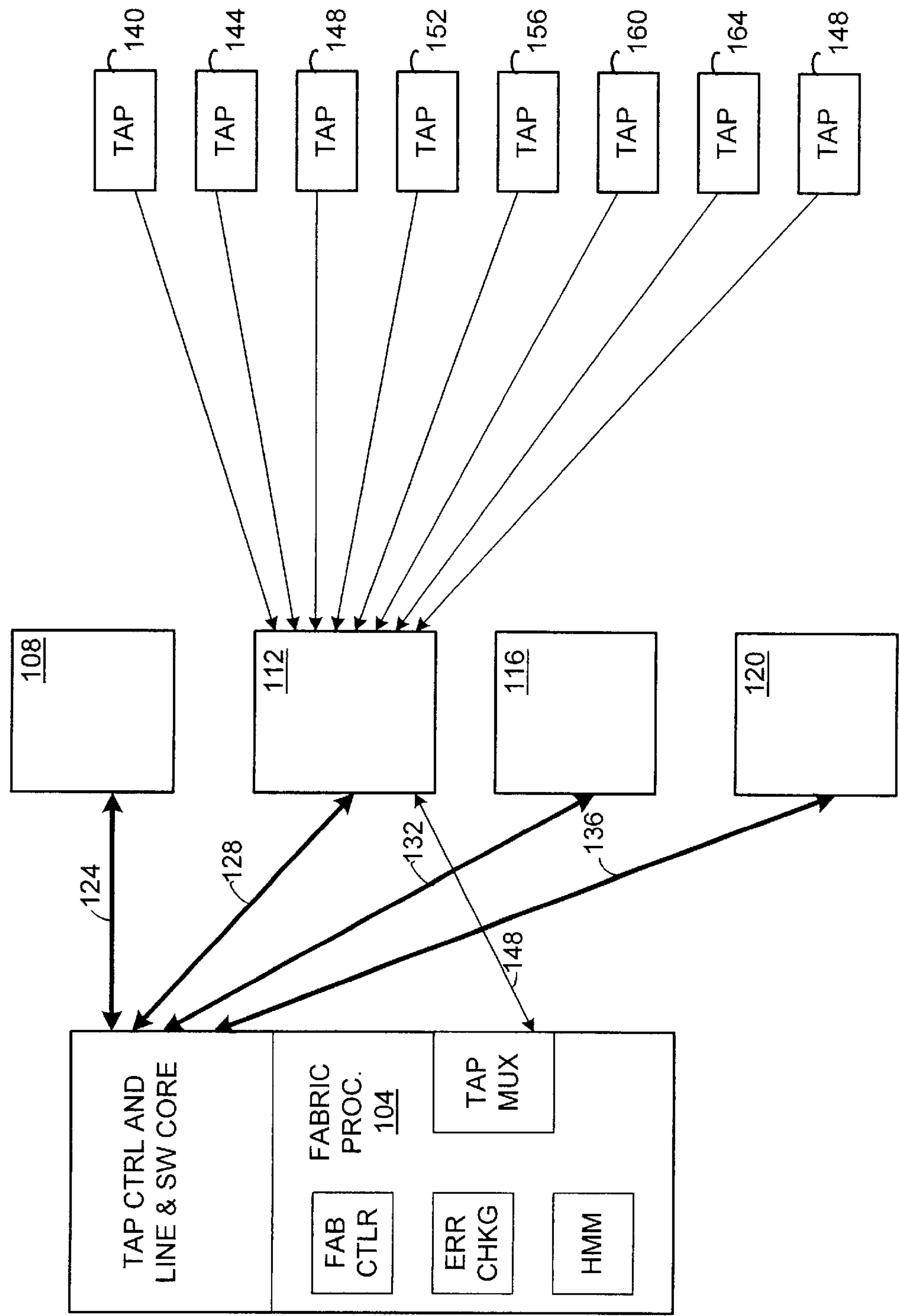
FIG. 1 is a functional block diagram of a switch fabric including a Fabric controller according to a described embodiment of the present invention.

FIG. 1 is a functional block diagram of a switch fabric including a Fabric controller according to a described embodiment of the present invention. Referring now to FIG. 1, the Fabric controller 104 is coupled to communicate with a plurality of fabric access devices (FAD) 108, 112, 116, and 120 over a plurality of 8-bit parallel buses 124, 128, 132, and 136 respectively. While not explicitly shown, Fabric controller 104 also is coupled to communicate with four additional FADs over four additional 8-bit parallel buses for the protection path. Each of the FADs 108, 112, 116, and 120 as well as the four protection path FADs are coupled to 9 Tap Muxes, namely, Tap Mux 0 through Tap Muxes 7 and to a Tap mux of the Fabric controller 104.

As will be explained in greater detail elsewhere, each Tap Mux, namely, Tap Mux 0 through Tap Muxes 7 and the Fabric controller Tap Mux, is coupled to each FAD, of the primary path as well as the connection path with two serial data lines. Each serial line of the Tap Muxes is used to transmit a 4-bit data (nibble) to the respective FAD. The FAD receiving the nibble then combines the two 4-bit nibbles to create an 8-bit word and to convert that 8-bit word from a serial format to a parallel format for transmission on the 8-bit parallel bus to the Fabric controller 104.

The Fabric controller 104 includes an error checking module 172, a fabric controller module 176, and a health maintenance module 180. With the error checking module 172 is for monitoring the signals receive on each of the four FADs from the Fabric controller as well as from the 8 Tap Muxes, namely, Tap Mux 140, 144, 148, 152, 156, 160, 164, and 168. As indicated before, each Tap Mux transmits over two serial data lines to each FAD for the primary path and two for the protection path. Accordingly, error checking module checks for errors on 18 data lines for each of the four FADs. As is known, each Fad includes firmware or software that monitors the signaling over the input data lines to generate flags or signals indicating that specified error types have been detected during the transmission of a data byte over a data line. Herein the described embodiment, an error signal is generated upon the occurrence of a detected error for any one of the two serial data lines received from a Tap Mux since the two serial lines are used to generate one eight bit word or signal.

The Health Maintenance Module 180 includes the logic for monitoring defined error conditions and for determining for switching should occur from the primary path to the protection path based on detected error conditions (stored error signals) for any of the serial data line sources received by each of the four FADs. In general, if a defined error threshold number is exceeded on any one of the thirty-six input data line sources for the four fabric access devices, the health maintenance module determines that switching to the protection switch fabric should occur. A more detailed description of the operation and logic of the health maintenance module 180 is explained below.

Figure 2:
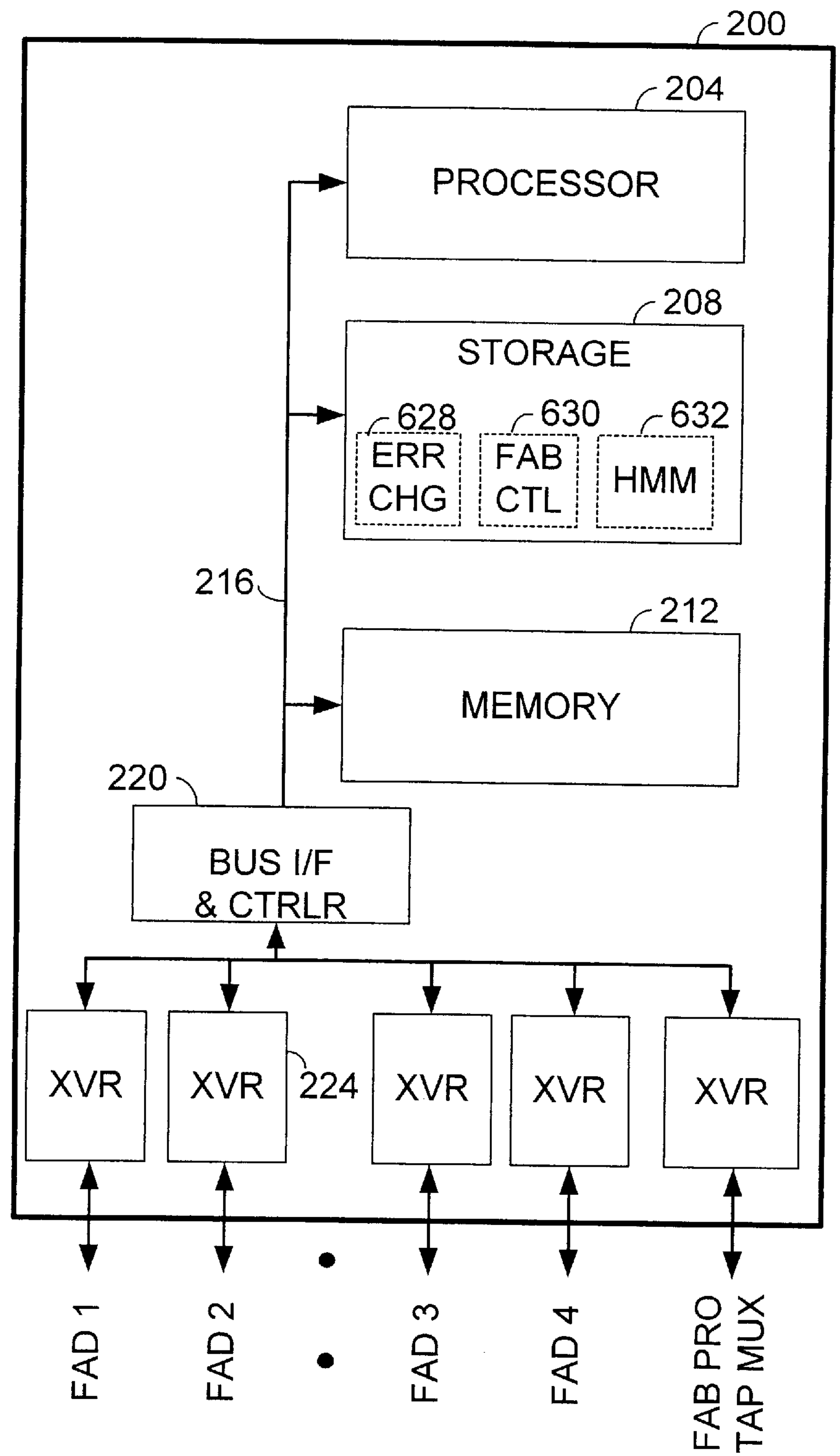
FIG. 2 is a functional block diagram of a Fabric controller according to a described embodiment of the invention.

FIG. 2 is a functional block diagram of a Fabric controller processor according to a described embodiment of the invention. More specifically, the Fabric controller 200 includes a central processor unit 204, a storage device 208, and a memory, each of which being operable to communicate with each other over a bus 216 that is controlled by a bus controller 220. Bus controller 220 in turn is coupled to communicate with a transceiver 224 that transmits and receives a bit of data at a time in a parallel manner.

Storage device 208 includes computer instructions for defining the logical operation of a Fabric controller as well as logic for switching to the protection path for reasons other than defined herein. Specifically, however, the switching logic defined by the computer instructions within storage device 208, when prompted by processor 204, causes switching to occur to the protection path whenever a specified number of defined errors occur within a specified period. The described embodiment of the invention, a fixed window of a hundred-milliseconds is defined wherein, if 10 or more defined errors occur within the one hundred-millisecond window, switch over is effectuated.

In implementation, the one hundred-millisecond window is a fixed length window. In other words, ten defined errors must be detected within 100 milliseconds of the detection of the first error. Thus, as will be explained in greater detail below, occurrence of 10 errors within a hundred-millisecond window may not cause a switch over to the protection path if those 10 errors are not detected within the defined hundred-millisecond window.

Conceptually, the fixed window may be compared a bucket that overflows whenever it receives 10 or more units. Herein, the bucket is "emptied" 100 milliseconds after the detection of a first error. Thus, an overflow condition occurs only if 10 errors are received prior to the bucket being emptied. It is the overflow condition that prompts selection of the protection switching fabric.

Figure 3:
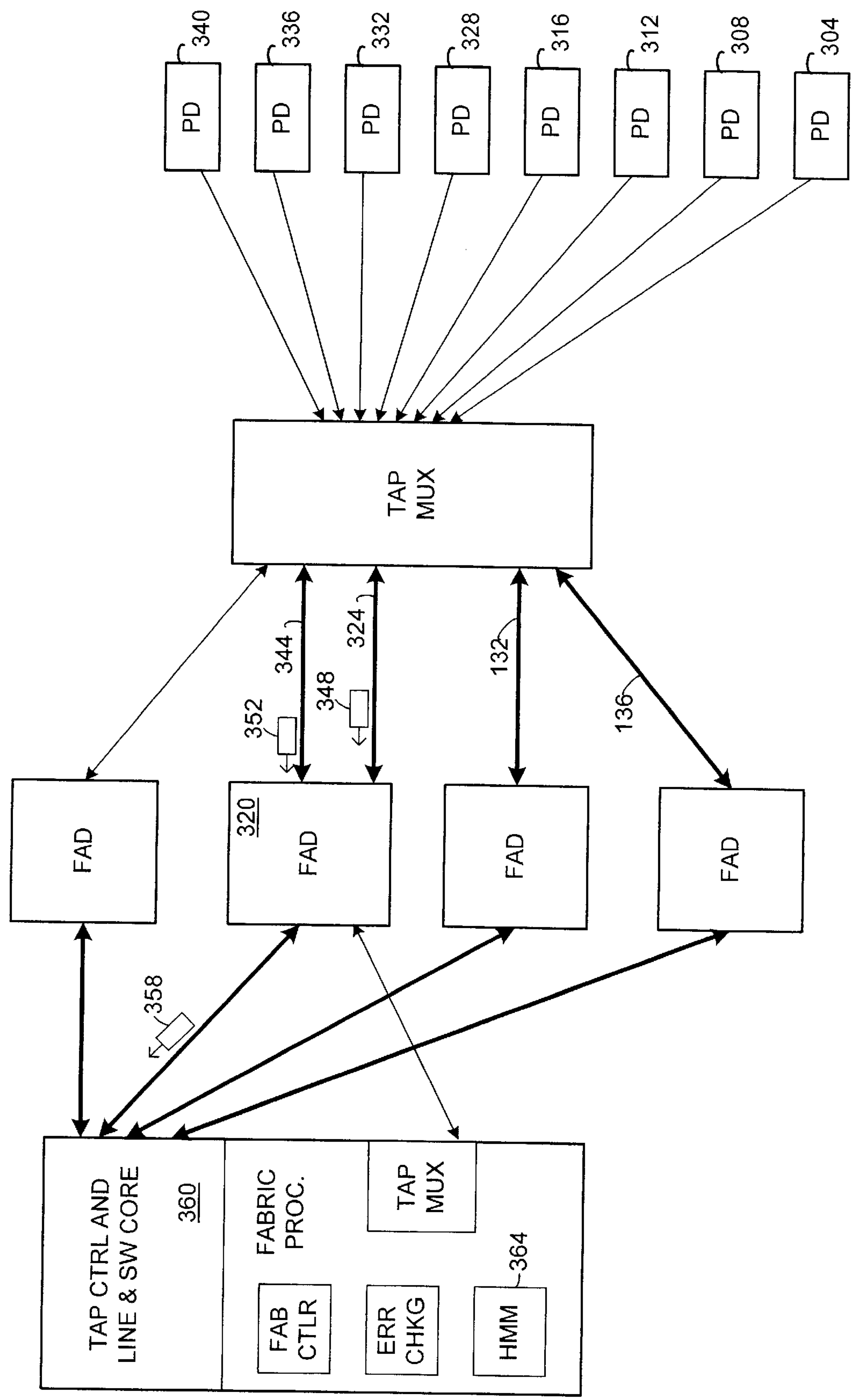
FIG. 3 is a functional block diagram of a Tap Mux in communication with four fabric access devices and 8 port devices, wherein, the four FADs are coupled to a Fabric controller formed according to one embodiment of the present invention.

FIG. 3 is a functional block diagram of a Tap Mux in communication with four fabric access devices and 8 port devices, wherein, the four FADs are coupled to a Fabric controller formed according to one embodiment of the present invention. As may be seen, Tap Mux 300 is coupled to receive serial data from each of 8 port devices 300 through 340. Each of the port devices produces serial data to the Tap Mux. For exemplary purposes, Tap Mux 300 receives eight bits from the first serial port 304 to form the two 4-bit nibbles of data 348 and 352. The Tap Mux similarly forms nibbles for each of the other port devices by selecting them in turn. Generally, a port device remains selected for transmitting data to create the nibbles 348 and 352 until a complete 80 byte ATM cell is completely transmitted. Thereafter, the next port device is selected. If it does not have an 80 byte cell ready for transmission, then the subsequent port device is selected.

Fabric controller 360 includes a health maintenance module 364 that monitors the inputs received by FAD 320 over lines 324, 344, and 358 to determine if specified errors occur thereon. One purpose of FIG. 3 is to illustrate the relationships between the various data sources and paths within the switching fabric.

Figure 4A:
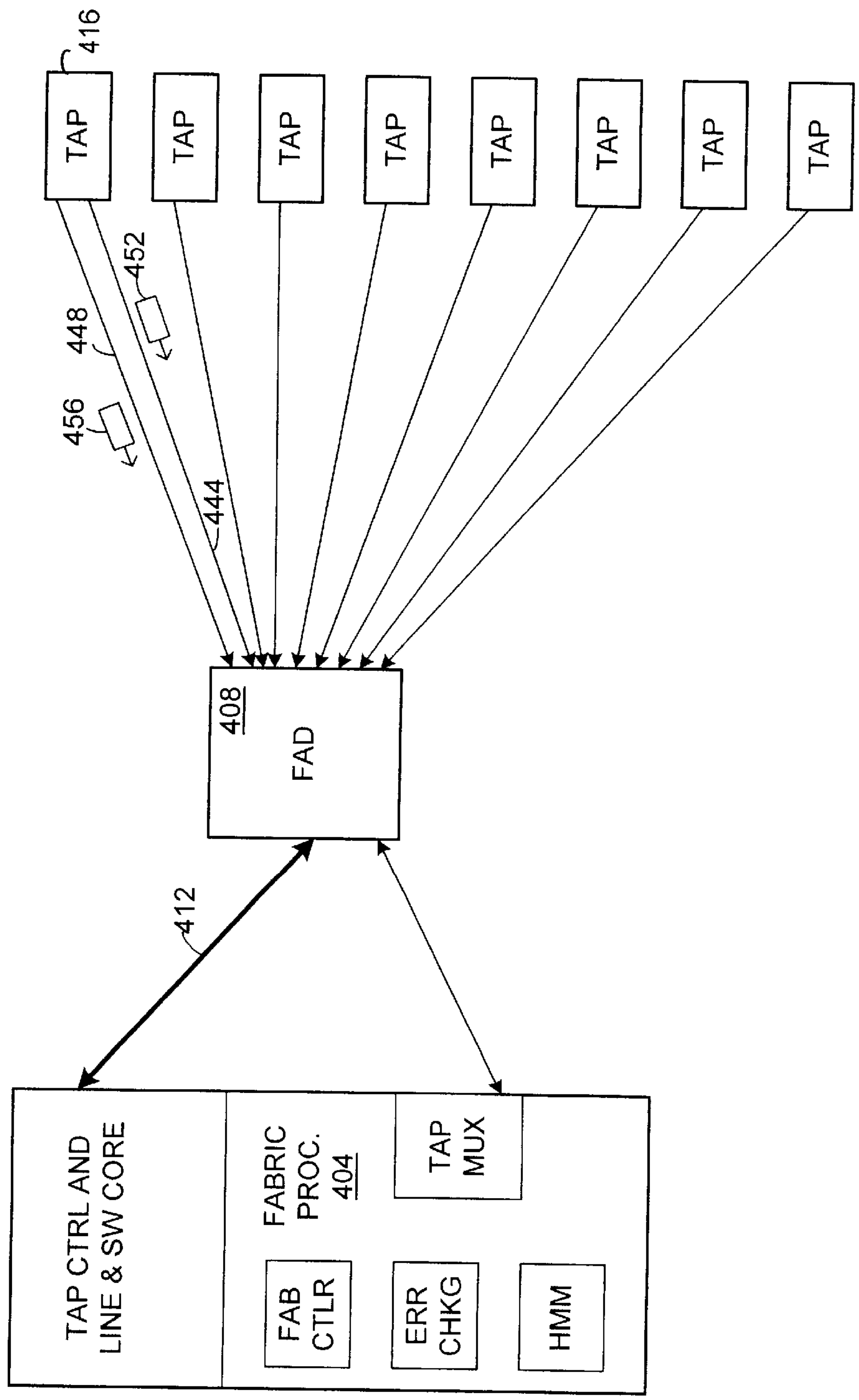
FIG. 4A is a functional block diagram that shows a Fabric controller in communication with a FAD over a bus.

FIG. 4A is a functional block diagram that illustrates a Fabric controller 404 in communication with a FAD 408 over a bus 412. Bus 412, is described as elsewhere, is an 8-bit parallel bus. FAD 408 is communicatively coupled to each of the Tap Muxes 416 through Tap Mux 440 as well as to a Tap Mux that is formed within Fabric controller 404. Each of the Tap Muxes are coupled to communicate with FAD 408 over two serial data lines. For exemplary purposes, Tap Mux 416 is coupled to FAD 408 over data lines 444 and 448. As may also be seen, Tap Mux 416 is transmitting 4-bit nibblets 452 and 456 to FAD 408. FAD 408 in turn combines the two nibblets to create one 8-bit word that is transmitted over bus 412 to Fabric controller 404 in a parallel bus.

Figure 4B:
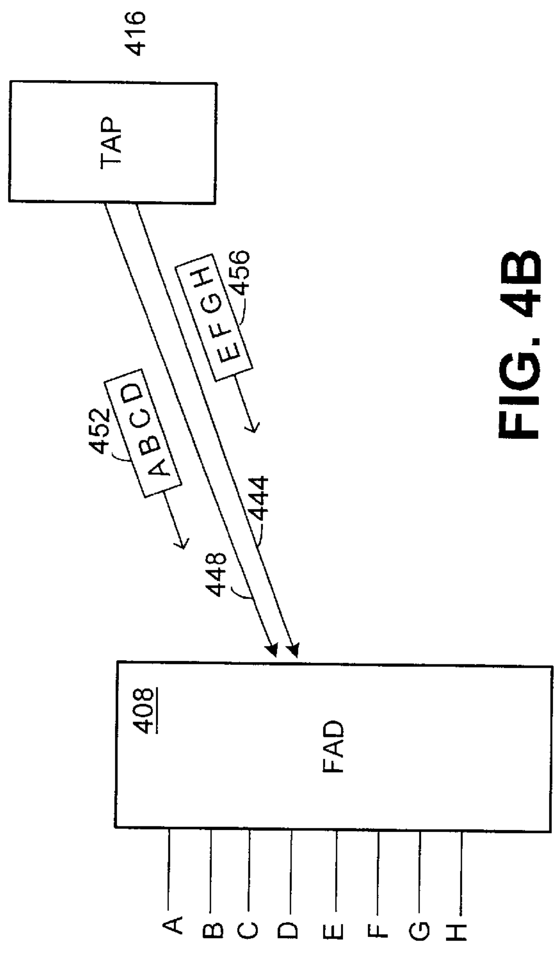
FIG. 4B illustrates with greater detail the functionality of the FAD in terms of combining the 4-bit niblets to create one 8-bit word.

FIG. 4B illustrates with greater detail the functionality of the FAD in terms of combining the 4-bit nibblets to create one 8-bit word. As may be seen, nibblet 452 includes data bits A, B, C and D and nibblet 456 includes data bits E, F, G and H. FAD 408 combines the two nibblets 452 and 456 to create one 8-bit word having bits A through H. Health maintenance module 364 of Fabric controller 404 monitors the detection of specified errors occurring on each of the data line sources on which signals are transmitted to FAD 408. Thus, FIG. 4A illustrates that health maintenance module 364 monitors the input for signals transmitted to FAD 408 from nine different sources. The error checking that occurs and the fabric switching logic of the described algorithm is, for the system shown in FIG. 4A, is executed by nine different state machines. A state machine monitors each of the nine input line sources of FAD 408 for errors to determine whether switching to the protection switch fabric is occur.

In the described embodiment of the invention, software (or firmware) within Fad 408 actually deterines if errors occur and then builds a list of error for each transmission of the two 4-bit nibbles of data received from the Tap Muxes on a given data line source. The list of errors are monitored by the Fabric controller 404. In the described embodiment, the Fabric controller polls Fad 408 to receive queued errors (if any) over a communication line (e.g., lines 452 and 456). In another described embodiment, Fad 408 periodically transmits detected errors to Fad 408 for analysis by the health maintenance module.

Figure 5:
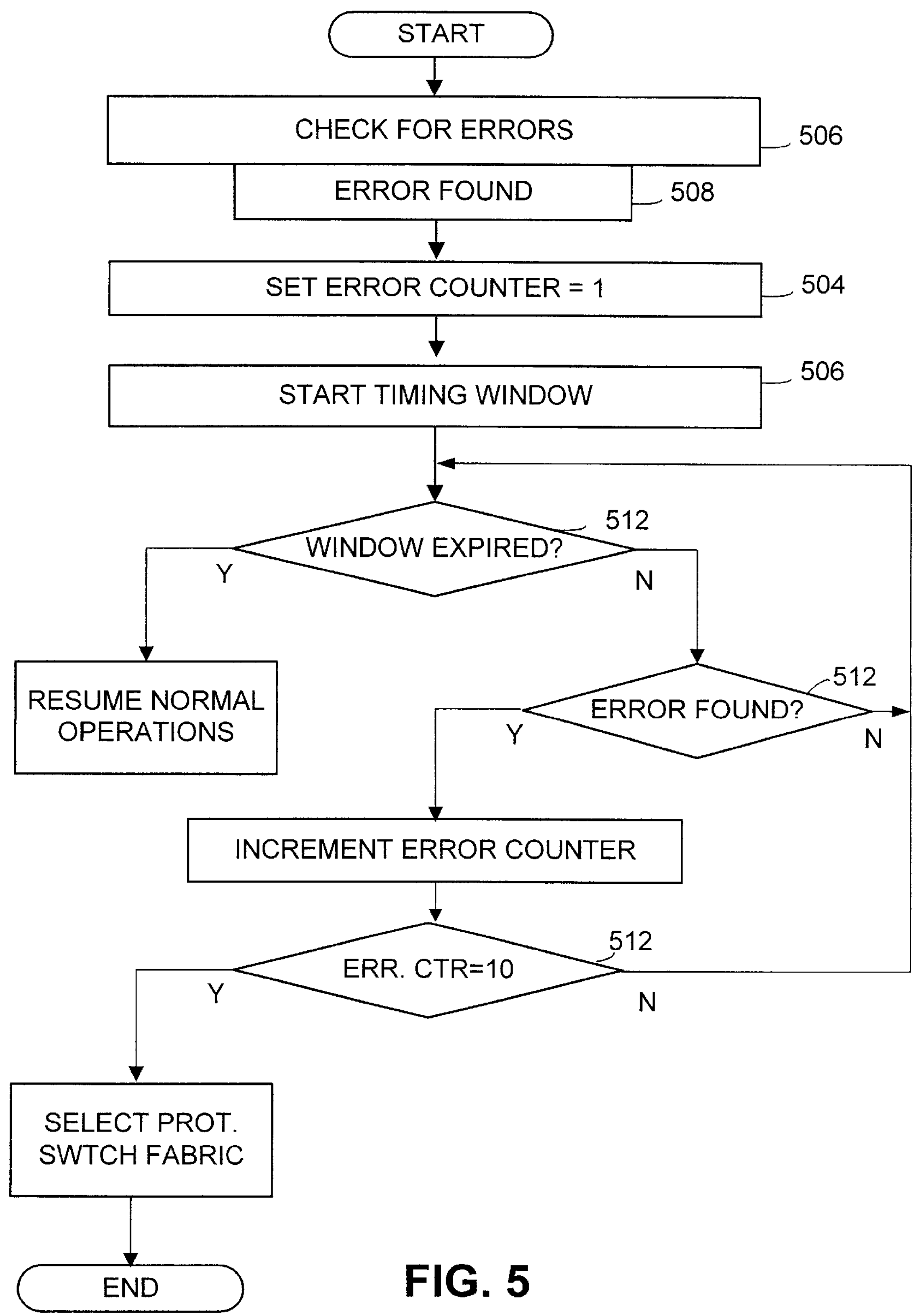
FIG. 5 is a flow chart illustrating a method for determining whether to switch an ATM switching fabric from a primary side to a protection side according to a described embodiment of the present invention

FIG. 5 is a flow chart illustrating a method for determining whether to switch an ATM switching fabric from a primary side to a protection side according to a described embodiment of the present invention. Initially, a Fabric controller checks for errors (step 504). As with the explained in greater detail below, specific lists of errors are monitored by the Fabric controller. Additionally, as has been described previously, the Fabric controller performs the error checking for a total of 72 input line sources received at one of four different fabric access devices. Accordingly, the error-checking (step 504) is actually performed by 72 different state machines. For the remaining portion of the discussion of FIG. 5, it should be understood that each of the steps shown herein is performed by each of the 72 state machines. For simplicity, the discussion will focus on the logic performed by only one at the 72 state machines. In an alternate embodiment, one state machine is operable to monitor Fad receive errors for all 72 data input line sources to the four fabric access devices.

After checking for errors, the Fabric controller continues to check for errors until it finds a specified error (step 508). Thereafter, the Fabric controller sets an error counter equal to the value of one and initiates a timing window. In the described embodiment of the invention, the timing window is a fixed length window of hundred-milliseconds. Thus, the next step is to determine whether hundred-milliseconds has expired (step 520), if hundred-milliseconds has expired, then normal operation is resumed (step 524) until the next error is detected. If the hundred-millisecond window has not expired, then the Fabric controller checks for errors again (step 528). If no error is found, then the Fabric controller goes back to (step 520) to determine if the hundred-millisecond has expired. If, on the other hand, an error is found, then the error counter is incremented (step 532). Thereafter, the Fabric controller determines whether the error counter is equal to or exceeds the value 10.

Figure 6:
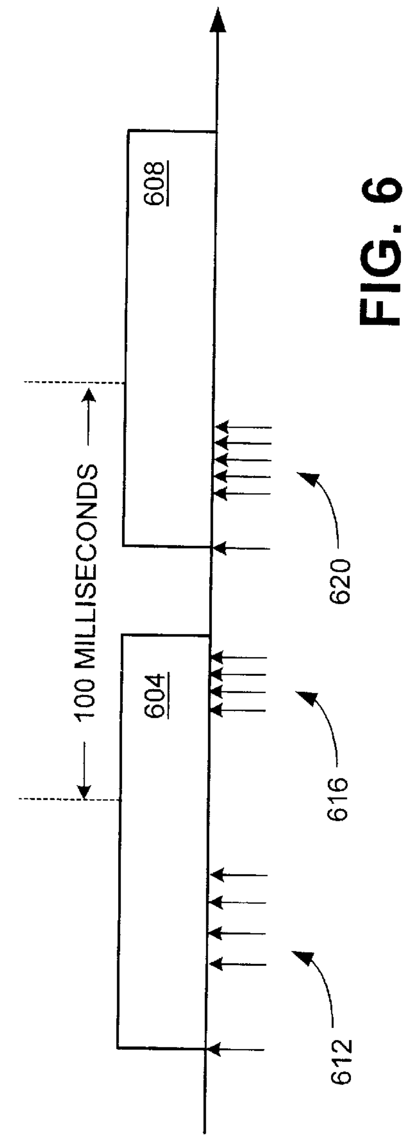
FIG. 6 is a timing diagram to illustrate operation of the timing window with respect to the counting of detected errors.

FIG. 6 is a timing diagram to illustrate operation of the timing window with respect to the counting of detected errors. Referring now to FIG. 6, it may be seen that two one hundred-millisecond windows are shown. Window 604 is defined at the detection of the first error. Window 608 is defined after window 604 expires in the example of FIG. 6 at the detection of the tenth error since it is the first error after expiration of window 604. Once the tenth error is identified, a new hundred-millisecond window 608 is initiated. Switching to the protection switch fabric does not occur here because error was not detected within the period of window 604. Moreover, as may be seen a total of 10 errors is detected within a hundred-millisecond period but the distribution of errors does not result in switching to the protection switch fabric.

Figure 7:
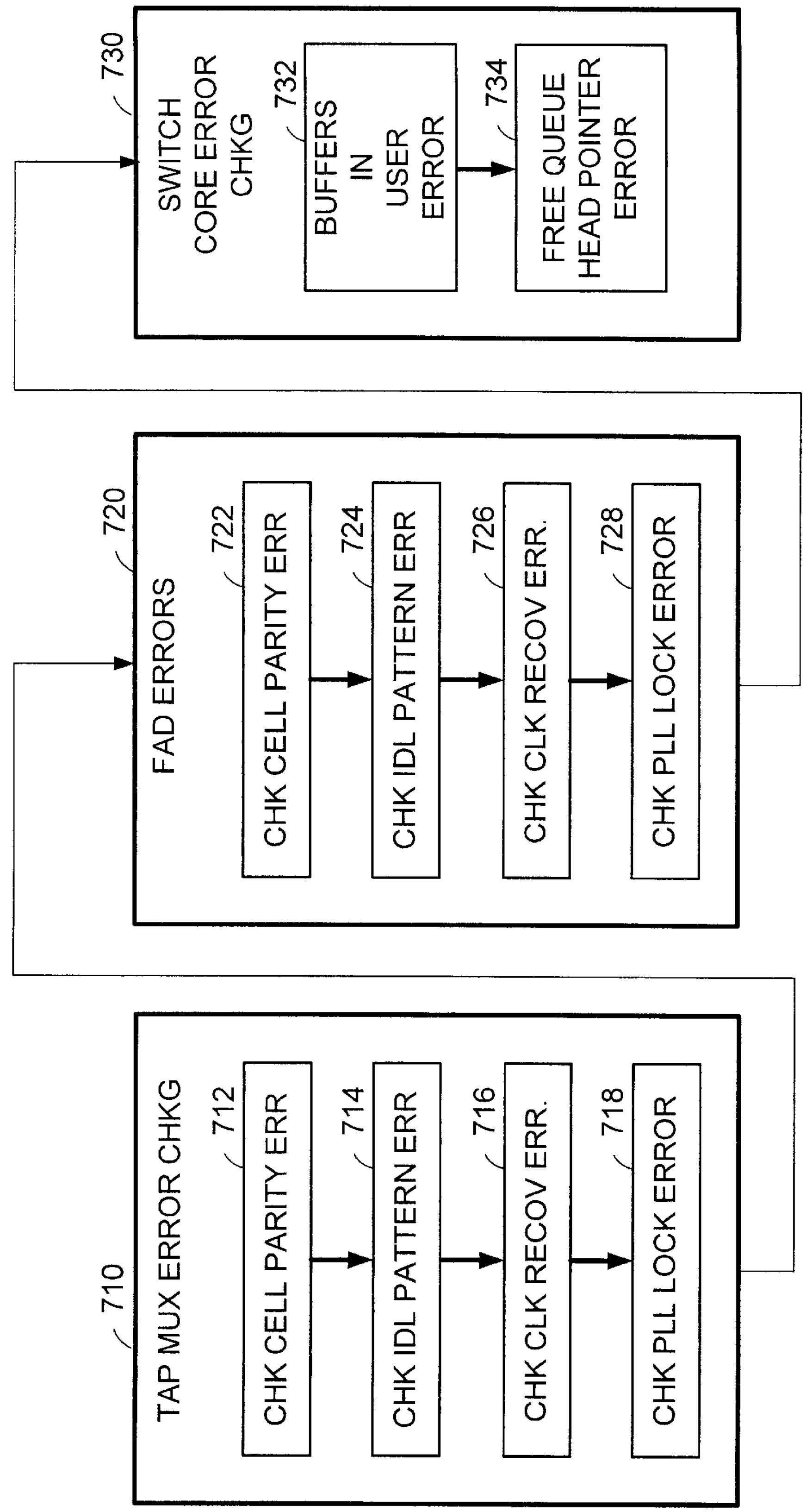
FIG. 7 is a flow chart illustrating a method for error checking for each of the 72 input line sources of the four fabric access devices of an ATM switching fabric according to one embodiment of the present invention.

FIG. 7 is a flow chart illustrating a method for error checking for each of the 72 input line sources of the four fabric access devices of an ATM switching fabric according to one embodiment of the present invention. The method of FIG. 7 includes three basic steps. First, the top multiplexer is checked for errors (step 710), second, the fabric access devices are checked for errors (step 720). Finally, the switch fabric itself is checked for errors (step 730). With respect to (step 710), four different types of errors are monitored. Specifically, the Fabric controller, for example, Fabric controller 360 of FIG. 3 or Fabric controller 404 of FIG. 4A checks for cell parity errors (step 712), idle pattern errors (step 714), clock recovery errors (step 716), or phase lock loop lock errors (step 718). Other known types of errors may be monitored in place of or in addition to these errors.

Each of these errors are known to those skilled in the art. In general, cell parity relates to parity error checking indicating that a cell had a bit that changed state or that a bit was inadvertently dropped during the transmission. The idle pattern error indicates that an ATM data line has been idle in excess of a defined period. A clock recovery error is one indicating clock recovery synchronization problems are being detected. The Phase lock loop lock error indicates that the phase lock loop lock state machines are attempting to align the two clocks too frequently thereby, again, reducing through put capacity.

The error checking of (step 720) is the same as that of the Tap Mux of step 710 in the described embodiment of the invention. Finally, the Fabric controller checks for buffers in use in (step 732) or free queue head pointer in (step 734) for detecting errors in the switch fabric.

The inventive method and apparatus disclosed herein are particularly advantageous in that they provide a capability for effectuating fabric switching from a primary to a protection path in a manner is fast and that is efficient in terms of system code and resources.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. For example, there are many different ways the Fabric controller may monitor for errors generated within the Fad by Fad software or firmware. Additionally, different or additional errors may be monitored from those illustrated in the described embodiments herein without departing from the scope of the invention. As may be seen, therefore, the described embodiments may be modified in many different ways without departing from the scope or teachings of the invention.

What is claimed is:

1. A Tap Mux controller for selecting between a primary switch fabric and a protection switch fabric, comprising:

a storage device for storing computer instructions;

an internal bus coupled to communicate with the storage device;

a port coupled to the internal bus;

a processor coupled to communicate with the storage device by way of the internal bus wherein the processor executes the computer instructions stored within the storage device; and wherein the computer instructions define logic for prompting the processor to communicate with a plurality of fabric access devices by way of the port to monitor for specified receive errors and wherein the processor selects the protection switch fabric whenever a specified number of errors of a defined list of errors within a defined period.

2. The Tap Mux controller of claim 1 wherein the defined logic prompts the processor to select the protection path only if the ten errors are detected within a defined time window.

3. The Tap Mux Controller of claim 1 wherein the defined time window starts at the detection of the first error and wherein the time window is reset after 100 milliseconds if 10 specified errors were not detected within the time window.

4. The Tap Mux controller of claim 1 wherein the defined logic prompts the processor to monitor only errors detected during transmission of signals to the plurality of fabric access devices.

5. The Tap Mux Controller of claim 4 wherein controller monitors for transmission errors in signals being transmitted to four fabric access devices, and wherein the defined logic prompts the processor to monitor errors detected during the transmission of signal on any one of 72 communication lines coupled to the four fabric access devices.

6. The Tap Mux Controller of claim 5 wherein the logic prompts the processor to generate 72 state machines, one for each of the 72 communication line sources being monitored for defined errors.

7. The Tap Mux controller of claim 1 wherein the port is an eight bit parallel bus.

8. The Tap Mux controller of claim 1 further comprising four parallel buses that are eight bits wide each, wherein each eight bit wide bus is coupled to one of four fabric access devices.

9. A fabric controller for selecting between primary and protection switching fabrics, comprising:

a health monitoring module for determining when the protection path switching fabric should be selected over the primary path switching fabric;

wherein the health monitoring module defines a fixed length time window wherein switching to the protection path only occurs if a specified number of errors occur within a specified period of time while the fixed length time window is defined;

an error monitoring module communicatively coupled with the health monitoring module and for monitoring transmission errors within the primary and protection switching fabrics; and a switching module coupled to receive switching commands from the health monitoring module, the switching module for effectuating a switching change from one of the primary and protection switching fabrics to the other.

10. The Tap Mux controller of claim 9 wherein the fixed length time window is equal to 100 milliseconds.

11. The Tap Mux controller of claim 9 wherein the specified number of errors is equal to ten.

12. The Tap Mux controller of claim 9 wherein the error monitoring module creates up to 72 state machines for monitoring up to 72 lines transmitting signals to a plurality of fabric access devices.

13. A method for selecting a protection switch fabric over a primary switch fabric, comprising:

monitoring to detect specified transmission errors in communication signals being transmitted to at least one fabric access device;

defining a time window upon detecting at least one of the specified transmission errors;

counting errors during the defined time window; and selecting the protection switch fabric if a specified number of errors are counted during the defined time window.

14. The method of claim 13 wherein the protection path is selected if the specified number of errors are counted within a specified time period of the first error whereby protection path selection does not occur for a tenth or greater error if ten errors were not detected during the defined window.

15. The method of claim 14 wherein the protection path is selected if the specified number of errors are counted within a time period of the first error wherein the specified number of errors is equal to 10.

16. The method of claim 15 wherein the protection path is selected if the specified number of errors are counted within the specified time period is equal to 100 milliseconds.

17. The method of claim 16 wherein the protection path is selected if the specified number of errors includes parity errors.

18. The method of claim 16 wherein the protection path is selected if the specified number of errors includes idle pattern errors.

19. The method of claim 16 wherein the protection path is selected if the specified number of errors includes clock recovery errors.

20. The method of claim 16 wherein the protection path is selected if the specified number of errors includes PLL locking errors.

21. The method of claim 16 wherein the protection path is selected if the specified number of errors includes buffer related errors.

22. The method of claim 16 wherein the protection path is selected if the specified number of errors includes free queue head pointer related errors.

23. The method of claim 13 wherein the protection path is selected if the specified number of errors are counted within a specified time period relative to each other.

24. The method of claim 23 wherein the protection path is selected if the specified number of errors are counted within a time period of the first error wherein the specified number of errors is equal to 10.

25. The method of claim 24 wherein the protection path is selected if the specified number of errors are counted within the specified time period is equal to 100 milliseconds.

26. The method of claim 25 wherein the protection path is selected if the specified number of errors includes parity errors.

27. The method of claim 25 wherein the protection path is selected if the specified number of errors includes idle pattern errors.

28. The method of claim 25 wherein the protection path is selected if the specified number of errors includes clock recovery errors.

29. The method of claim 25 wherein the protection path is selected if the specified number of errors includes PLL locking errors.

30. The method of claim 25 wherein the protection path is selected if the specified number of errors includes buffer related errors.

31. The method of claim 25 wherein the protection path is selected if the specified number of errors includes free queue head pointer related errors.

32. An asynchronous transfer mode communication system for transmitting data through one of a primary switch fabric and a protection switch fabric, comprising:

a fabric controller;

a plurality of fabric access devices coupled to produce eight bit words to the fabric controller over a parallel bus;

a plurality of Tap Muxes, each coupled to produce 4 bit nibbles of data to one of the plurality of fabric access devices; and a plurality of ports for producing bits of data to the Tap Muxes.

33. The system of claim 32 wherein the Fabric controller selects the protection switch fabric over the primary switch fabric by monitoring the number of detected errors received at the fabric access devices.

34. The system of claim 33 wherein the fabric controller selects the protection switch fabric over the primary switch fabric whenever nine errors are detected within a defined period beginning with upon detection of a first error.

35. The system of claim 33 wherein the defined period is 100 milliseconds.

* * * * *